(12) United States Patent
Murai et al.

(10) Patent No.: US 8,353,472 B2
(45) Date of Patent: Jan. 15, 2013

(54) RAW SILICON CRUSHER (75) Inventors: Tsuyoshi Murai, Tokyo (JP); Toshinori Konaka, Tokyo (JP)

(73) Assignee: Teoss Co., Ltd., Tokyo (JP)

( * ) Notice: Subject to any disclaimer, the term of this patent is extended or adjusted under 35 U.S.C. 154(b) by 188 days.

(21) Appl. No.: 13/058,380

(22) PCT Filed: Aug. 20, 2009

(86) PCT No.: PCT/JP2009/003983
§ 371 (c)(1),
(2), (4) Date: Feb. 10, 2011

(87) PCT Pub. No.: WO2011/021243
PCT Pub. Date: Feb. 24, 2011

(65) Prior Publication Data
US 2011/0253823 A1    Oct. 20, 2011

(51) Int. Cl.
*B02C 1/10* (2006.01)

(52) U.S. Cl. ............................ 241/65; 241/269; 241/270

(58) Field of Classification Search ..................... 241/65, 241/264–270.262, 198.1, 23
See application file for complete search history.

(56) References Cited

U.S. PATENT DOCUMENTS
2011/0024533 A1*  2/2011  Hayashida ...................... 241/27

FOREIGN PATENT DOCUMENTS
| JP | 02-152554 | 6/1990 |
| JP | 10-015422 | 1/1998 |
| JP | 2005-103529 | 4/2005 |
| JP | 2007-296471 | 11/2007 |

* cited by examiner

*Primary Examiner* — Mark Rosenbaum
(74) *Attorney, Agent, or Firm* — Lucas & Mercanti, LLP (57) ABSTRACT

The raw silicon crusher comprises a pair of beds; and a pair of crushing surfaces on the beds crushing the quenched pure raw silicon by applying pressure; wherein each of the beds comprises a case; pure silicon members arranged inside of the case and protruding from the opening; a block of pure ice fixing the pure silicon members to the case, and each of the crushing surfaces comprises surfaces of ends of protrusions; and surface of the block of ice.

5 Claims, 6 Drawing Sheets

RAW SILICON CRUSHER

This is a 371 of PCT/JP2009/003983 Aug. 20, 2009 which is incorporated herein by reference.

BACKGROUND OF THE INVENTION

1. Field of the Invention

The present invention relates to a raw silicon crusher that crushes raw silicon for silicon wafers used for semiconductors.

2. Description of the Related Art

Silicon wafers used for semiconductors are produced by cutting radially single crystal silicon rods by predetermined size in thickness. The single crystal silicon rods are produced by "Czochralski process." The Czochralski process is a method of crystal growth by dipping seed crystal, mounted on a rod, into molten raw silicon before pulling upwards and rotating the rod at a same time. The raw silicon is leftover single crystal silicon after cutting out the silicon wafers, or multicrystal silicon produced by "Siemens process" or "Monosilane process," for example.

The raw silicon is melted by heat in a silica (quartz) crucible. For efficient melting, the raw silicon is required to be crushed and reduced its size for filling easily into the crucible.

Usually, the raw silicon was crushed by humans using tungsten hammers or the like. Because crushing the raw silicon by humans is a hard work, the arts for cutting down on labor as much as possible are suggested. For example, a crusher (a jaw crusher) having tungsten carbide jaw faces, or a silicon heating and quenching machine cracking the raw silicon by quenching after heating, as described in the Patent Document 1: International publication No. 09/019,749.

SUMMARY OF THE INVENTION

Even if any raw silicon crush arts are selected, the fineness of the raw silicon decreases, because the tungsten (from the hammers) or the tungsten carbide (from the jaw crusher) contaminates a surface of the raw silicon. Additionally, the hammers or the jaw crusher generates high rate (10 to 20% in weight) of powder (less than 1 mm in particle size) raw silicon, called high "loss by pulverization."

In contrast, using a lump of the raw silicon as a hammer on the raw silicon to be crushed minimizes the decrease in purity of the raw silicon. But this method requires the same or more effort to crush it, so workers might hurt their joints and hands.

Using the jaw face made of high purity silicon can avoid the decrease in purity of the raw silicon. But the jaw face must be fixed with a fitting made of metal other than silicon. Because the fitting causes metal contamination, it is difficult to avoid the decrease in purity of the raw silicon. Any metal contaminated parts of the raw silicon must be removed by chemical etching.

The present invention has been made to clear the above issues associated with the prior arts. It is therefore a main object of the present invention to provide a raw silicon crusher that can crush the raw silicon mechanically without the decrease in purity of the raw silicon and the high "loss by pulverization."

Figure 5:
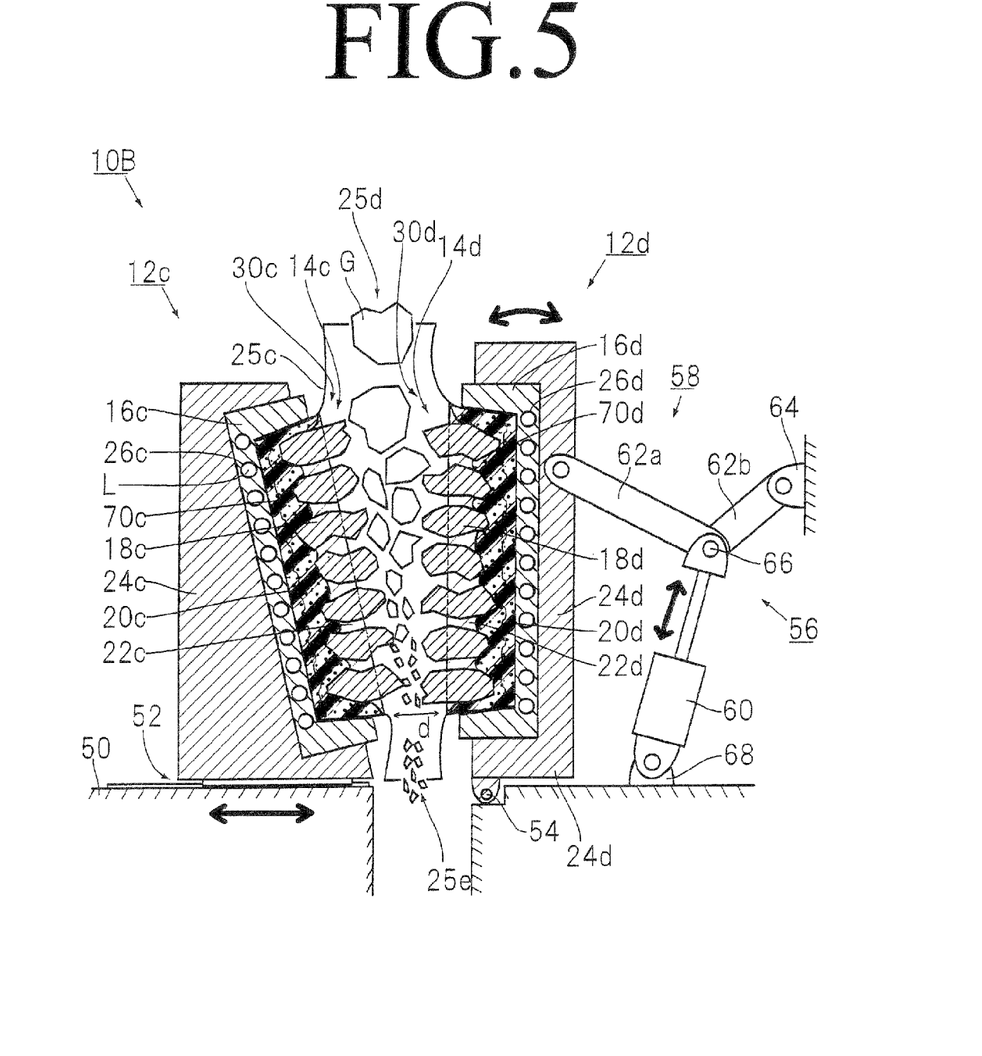
FIG. 5 is a cross-sectional view of a raw silicon crusher according to second embodiment.

Hereinafter, the present invention will be described by using FIG. 1 and FIG. 5 mainly. In addition, in the present specification, common reference numerals and characters are provided to those component parts which have common functions, and alphabets are added in the case where differentiation is required (for example, "a" and "b" in FIG. 1, and "c" and "d" in FIG. 5). In this "[S]ummary of the invention", the reference numerals and characters of the first embodiment 10A (i.e. the numerals with "a" or "b") are used as representatives of common component parts between the first embodiment 10A (FIG. 1) and the second embodiment 10B (FIG. 5). This, of course, is not intended to exclude the second embodiment and other embodiments from the scope of the present invention.

According to a first aspect of the present invention, a raw silicon crusher 10A comprises:
a pair of beds 12a, 12b facing each other; and
a pair of crushing surfaces 14a, 14b on the beds 12a, 12b crushing the quenched pure raw silicon G by applying pressure,
wherein each of the beds 12a, 12b comprises:
a box-shaped case 16a, 16b having an opening 30a, 30b on the crushing surface 14a, 14b side;
non-quenched pure silicon members 18a, 18b arranged inside of the case 16a, 16b and protruding from the opening 30a, 30b;
a block of ice 22a, 22b made from purified water provided inside of the case 16a, 16b and fixing the pure silicon members 18a, 18b to the case 16a, 16b, and
each of the crushing surfaces 14a, 14b comprises:
surfaces of ends of protrusions 32a, 32b of the pure silicon members 18a, 18b; and
surface of the block of ice 22a, 22b between each of the ends of protrusions 32a, 32b.

The raw silicon crusher 10 of the present invention crushes the raw silicon G by applying pressure between the crushing surfaces 14a, 14b of the beds 12a, 12b. The pure silicon members 18a, 18b arranged inside of the box-shaped case 16a, 16b and protruding from the opening 30a, 30b are fixed with the ice 22a, 22b made from purified water. Consequently, the crushing surfaces 14a, 14b are formed of the surfaces of the ends of protrusions 32a, 32b of the pure silicon members 18a, 18b and the surface of the ice 22a, 22b.

This eliminates the need for any fittings, for fixing the pure silicon members, made of a metal except silicon. Consequently, the pure silicon and purified water only contact the raw silicon G, and the possibility for the decrease in purity of the raw silicon will be minimized.

And the raw silicon is not crushed by applying impact but by applying pressure. This results in the minimization of "the loss by pulverization" to approximately two to three percent (mass %).

Column-shaped pure silicon members 18a, 18b may be arranged parallel to one another and parallel to the crushing surface 14a, 14b as in the raw silicon crusher 10A. And column-shaped pure silicon members 18a, 18b may be arranged in tandem. In this case, the top surfaces of the column-shaped pure silicon members 18a, 18b constitute the crushing surface 14a, 14b. Irregular shape pure silicon members 18a, 18b may be arranged randomly as in the raw silicon crusher 10B.

The ends of protrusions 32a of the pure silicon members 18a of one bed 12a protruding from the opening 30a may be located between the ends of protrusions 32b of the pure silicon members 18b of the other bed 12b protruding from the opening 30b in applying pressure to the raw silicon G.

Figure 4:
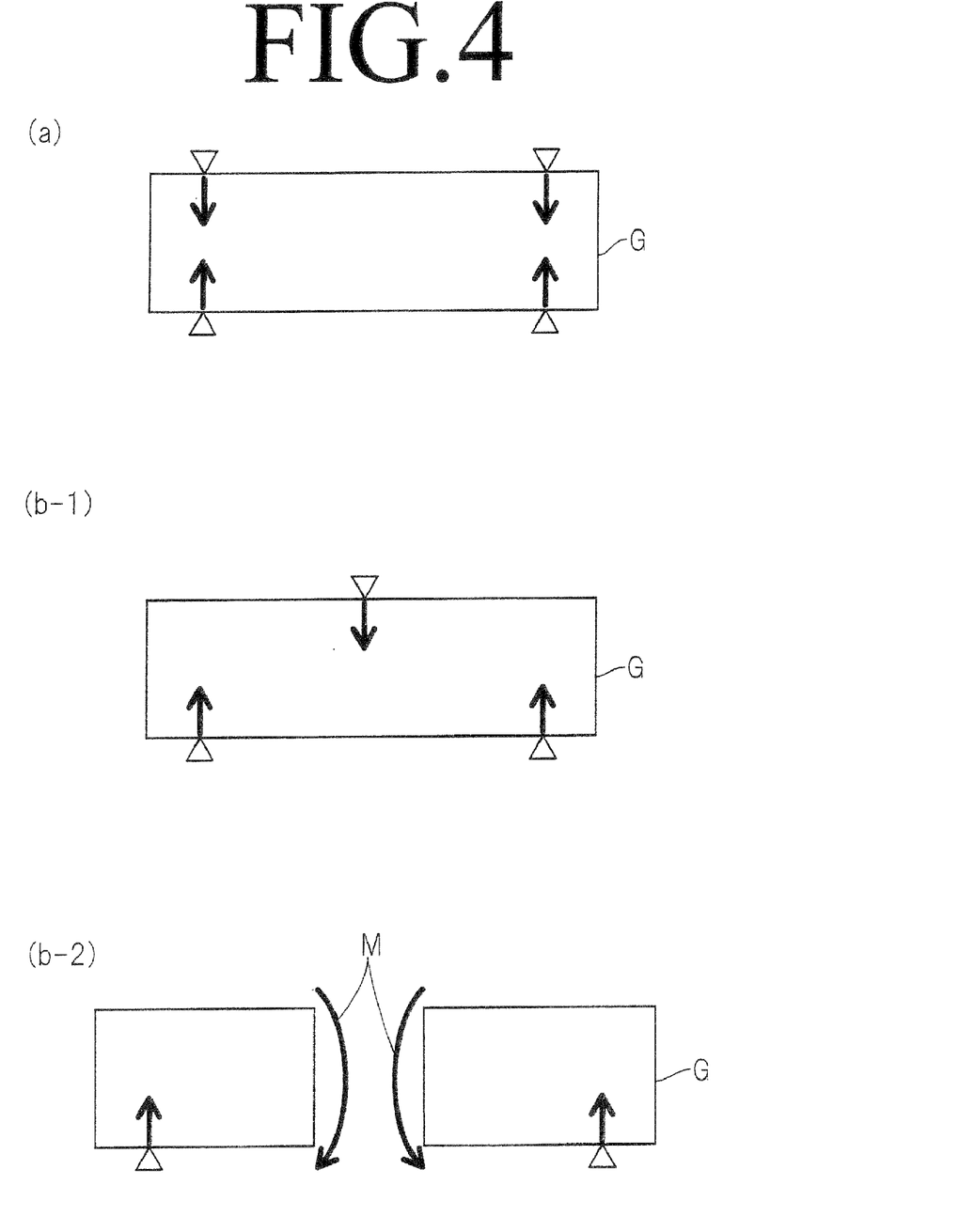
FIG. 4 shows a relation between position where pressure acts on and easiness for crushing.

The pure silicon members 18a, 18b is arranged as the ends of protrusions 32a of the pure silicon members 18a of one bed 12a protruding from the opening 30a locate between the ends of protrusions 32b of the pure silicon members 18b of the other bed 12b protruding from the opening 30b during applying pressure to the raw silicon G. This causes one end of protrusion 32a not to face the other end of protrusion 32b. Consequently, the applying pressure to the quenched raw silicon G is not only used as merely "pressure," as shown in FIG. 4(a), but also used as "moment." In case that the ends of protrusions do not face one another, as shown in FIG. 4(b-1), the downward pressure from upper ends of protrusions makes the moment around lower ends of protrusions, as shown in FIG. 4 (b-2). The "moment" crushes the raw silicon G easier than the "pressure." This allows decrease of strength for each member of the raw silicon crusher 10A and decrease of necessary power, i.e. power for hydraulic system or motor, for crushing the raw silicon G. Therefore, downsizing of the raw silicon crusher and decrease in initial cost and running cost are permitted.

The raw silicon crusher 10A may further comprise interconnected-cell foam resin mats 20a, 20b arranged between the pure silicon members 18a, 18b and bottoms 34a, 34b of the cases 16a, 16b.

The shape of the pure silicon members 18a, 18b is not limited to the column-shape and the irregular shape as described above. For each set of the pure silicon members 18a, 18b and the beds 12a, 12b, it is preferred to design a distance (hereinafter called "a protruding length X") between a base level, the bottoms 34a, 34b of the cases 16a, 16b in this embodiment, and the ends of protrusions 32a, 32b of the pure silicon members 18a, 18b constant.

If the protruding length X is not constant, the raw silicon G is caught between the pure silicon members 18 which have the longest protruding lengths X on each of the beds 12a, 12b. Consequently, the pure silicon members 18 which have the relatively short protruding lengths X may be apart from the raw silicon G. The pure silicon members 18 being apart from the raw silicon G cannot apply the pressure to the raw silicon. This results in remaining of massive raw silicon G in lump on the "short" pure silicon members 18.

According to the raw silicon crusher 10A, the foam resin mats 20a, 20b, with absorb the difference between each of the pure silicon members' lengths, when the purified water is frozen. This allows the uniformity of the lengths X.

Furthermore, using "interconnected cell" mats 20a, 20b causes the pure silicon members 18a, 18b to freeze to inner surfaces of the cases 16a, 16b with the pure ice 22a, 22b, which gets into meander through holes (the interconnected cell) between upper surface and lower surface of the foam resin mats 20a, 20b. Consequently, the pure silicon members 18a, 18b are certainly fixed to the cases 16a, 16b.

Each of the beds 12a, 12b may have a skirt 25a, 25b enclosing a space between the crushing surfaces 14a, 14b during crush of the raw silicon G.

The skirts 25a, 25b prevent the crushed raw silicon G from scattering from the raw silicon crusher 10A.

The pair of beds 12c, 12d may be arranged vertically, and the crushing surfaces 14c, 14d may be farther apart at the top than at the bottom.

According to this raw silicon crusher 10B, the raw silicon G set between a pair of the beds 12c, 12d and crushed by pressure moves below, and becomes small. Finally, the raw silicon G, of which size is smaller than the clearance d at bottom of the crushing surfaces 14, 14d, is only discharged.

Setting the clearance between the crushing surfaces 14c, 14d a required particle size causes the raw silicon G that is equal or smaller than the required size to obtain.

According to the present invention, the pure silicon and purified water only contact the raw silicon G. This allows the raw silicon crusher to crush the raw silicon by less power than crushing by human power without the decrease in purity of the raw silicon and the high "loss by pulverization."

DESCRIPTION OF THE EMBODIMENTS

Hereinafter, the present invention will be described based on examples illustrated in drawings. First, pure silicon members 18, which have columnar bodies, for pressing raw silicon G according to a first embodiment is described, and then pure silicon members 18, which have irregular shape, according to a second embodiment is described. In the second embodiment, crushing surfaces 14 are arranged vertically.

The second embodiment is different from the first embodiment mainly in relation to the shape of the pure silicon members 18 and the orientation of the crushing surfaces 14. And thus, in the second embodiment, description of those component parts in common to the first embodiment is omitted by incorporating the description thereof in the first embodiment, and the different portions are mainly described.

Furthermore, as a third embodiment, a raw silicon crushing system 100, which has two raw silicon crushers 10 (one is from the first embodiment and the other is from the second embodiment) arranged in series, is described.

In addition, in the figures, the same reference numerals are provided to those component parts which have an identical structure, and alphabets (for example, "a" and "b" in the FIG. 1, and "c" and "d" in the FIG. 5) are added for distinction of each the identical structure. But if it is convenient, some component parts will be explained without the added alphabets.

First Embodiment

The raw silicon crusher 10A according to the first embodiment is suitable for crushing quenched and rod-shaped raw silicon G. The crusher 10A is also suitable for remains of the raw silicon made by CZ method, FZ method, or Casting method. As shown in FIG. 1 (a), the raw silicon crusher 10A has a pair of beds 12a, 12b arranged as one above the other. The raw silicon G is crushed by applying pressure between a pair of crushing surfaces 14a, 14b, facing each other, on the beds 12a, 12b. FIG. 2 is a perspective view showing the lower bed 12a. FIG. 1 (a) and FIG. 2 are used for following explanation.

Each of the beds 12a, 12b has a case 16, non-quenched pure silicon members 18, a foam resin mat 20, a block of ice 22, a base 24, a skirt 25, and a net 70. The base 24, the skirt 25, and the net 70 are not essential parts for the raw silicon crusher 10A.

The lower bed 12a is explained as follows. The explanation for the lower bed 12a is the same as for the upper bed 12b. Accordingly, the descriptions for the bed 12a are applied to the bed 12b.

The case 16a is a square box made of stainless steel. And the case 16a has an opening at the top in the crushing surface 14a direction. The case 16a has refrigerant pipes 26a on the bottom as follows. Refrigerant L, which freezes pure water filled within the case 16a and keeps the ice 22a, passes through the refrigerant pipes 26a. And tapered inner walls of the case 16a cause the skirt 25a provided along the inner walls to flare outwardly against the crushing surface 14b naturally.

At this time the skirt 25a becomes a pyramid or a cone in shape. If the refrigerant L is not used, the case 16 is returned to a freezer after a certain period of use.

Figure 1:
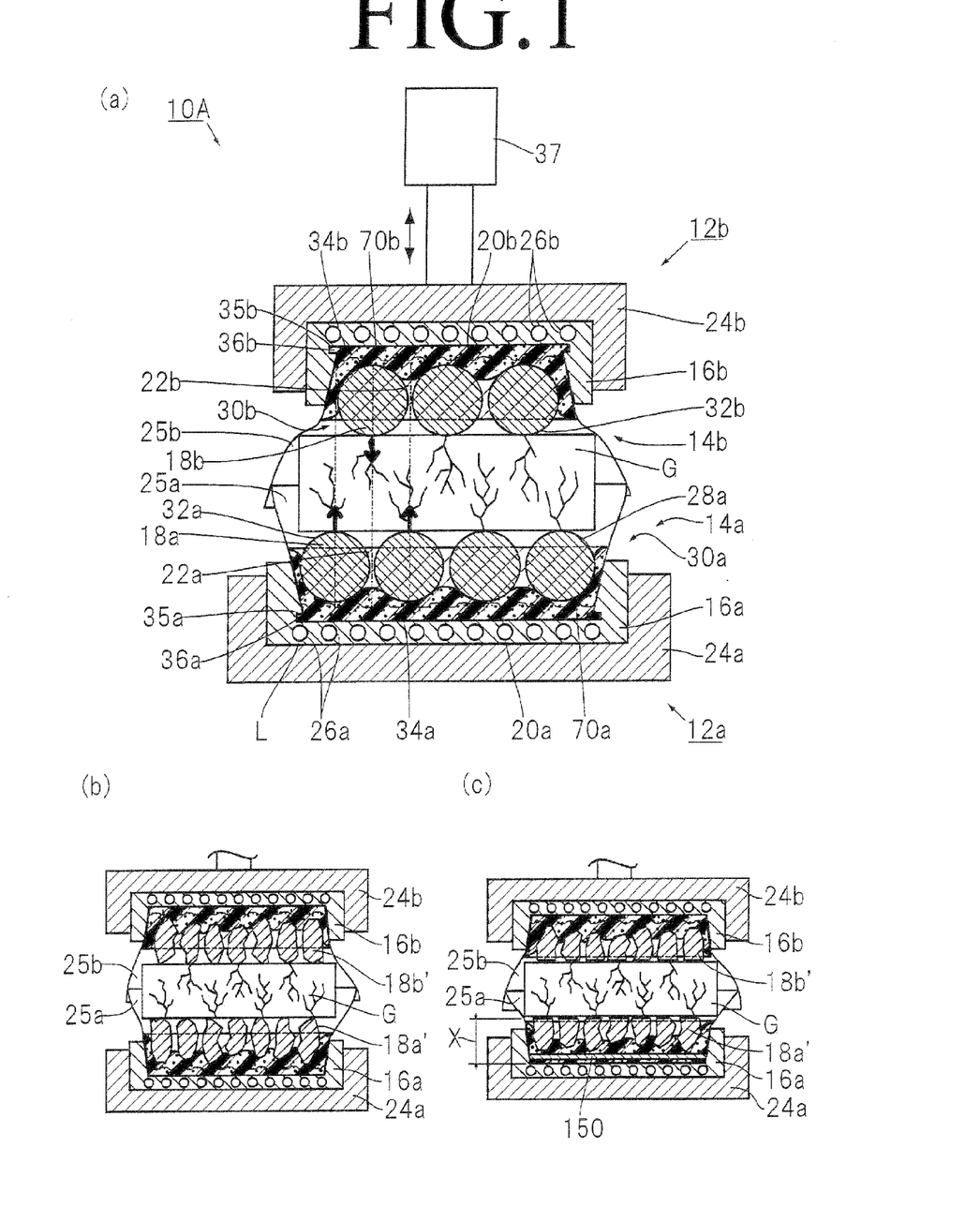
FIG. 1 is a cross-sectional view of a raw silicon crusher according to first embodiment.
Figure 2:
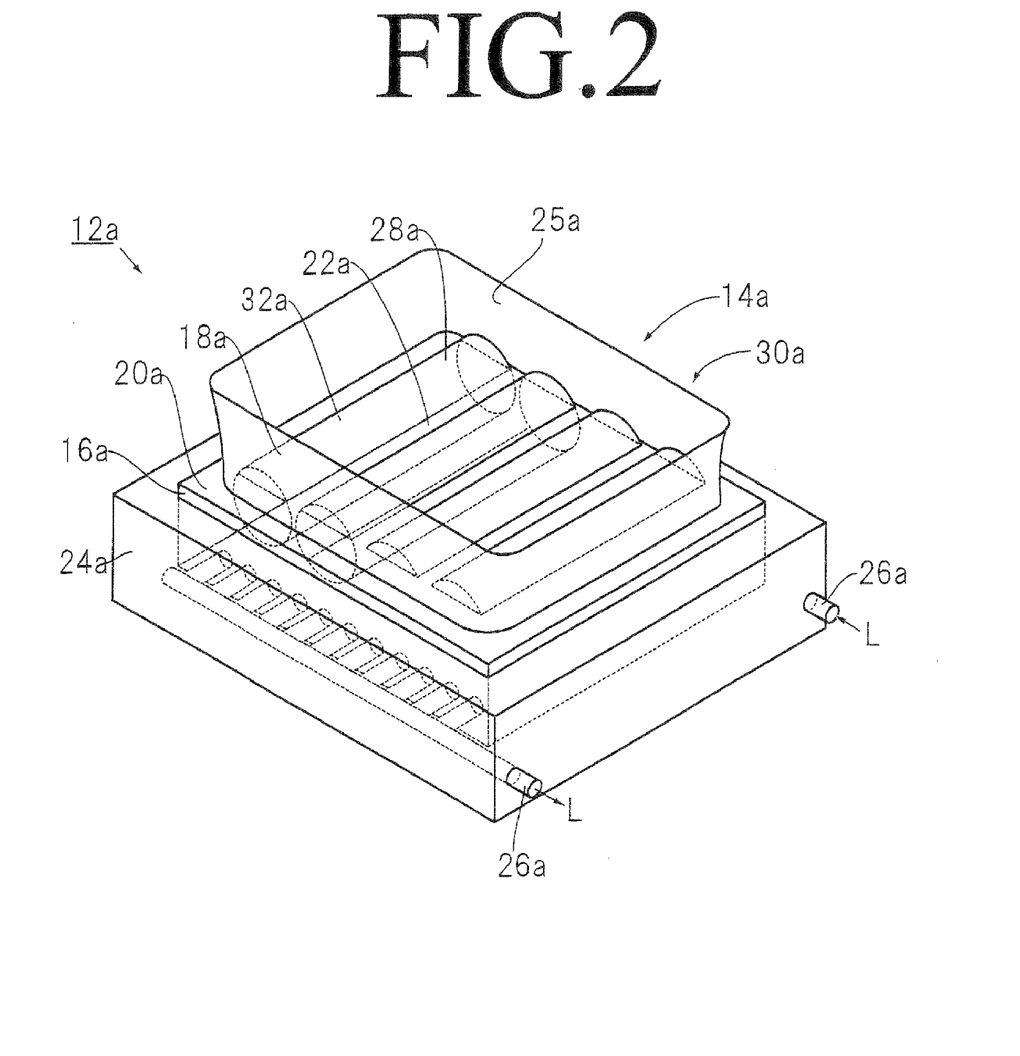
FIG. 2 is a perspective view of a raw silicon crusher according to the first embodiment.

The pure silicon members 18a, as shown in FIG. 1 (a), are produced by removing metallic contaminations by etching from non-quenched precut columnar polycrystalline silicon made by Siemens method. Other types of method for producing columnar silicon may be adopted. But Siemens method is suitable, because "hard" pure silicon members 18a can be obtained by the method. The pure silicon members 18a are eleven nines in purity comparable to the raw silicon G.

In this embodiment, a plurality of non-quenched and columnar pure silicon members 18a are arranged parallel to one another and parallel to the crushing surface 14a within the case 16a. And a part of the lateral surface 28a of each pure silicon member 18a protrudes from the opening 30a of the case 16a. The protruded part is referred as "an end of protrusion 32a." Four pure silicon members 18a for lower bed 12a and three for upper bed 12b are provided, but the number of the pure silicon members 18a is not limited to the embodiment. Furthermore, each end of protrusion 32a is not disposed in face-to-face with the ends of protrusions 32b directly. In other words, the ends of protrusions 32a of the pure silicon members 18a in the lower bed 12a are arranged between the ends of protrusions 32b of the pure silicon members 18 in the upper bed 12b.

The pure silicon members 18a may have irregular lump shapes as shown in FIG. 1 (b) or (c). A silicon block which is made by crushing polycrystalline silicon and removing contaminations with etching treatment is used for such an irregular block shaped pure silicon member 18a'. The polycrystalline silicon is made with Siemens method. In the FIG. 1(b), tips of the irregular block shaped pure silicon members 18a' protrude from the surface of the ice 22a. The protruding tips look like tusks. In the FIG. 1(c), the protruded parts of the irregular block shaped pure silicon members 18a' have planar surfaces, and each planar surface is arranged in same flat surface. In other word, each protruding length X of each pure silicon member 18a' is equal each other.

The foam resin "thick" mat 20a, which is made of interconnected cell resin, is provided between the pure silicon member 18a and the bottom 34a of the case 16a as shown in FIG. 1 (a). The foam resin mat 20a, to be hereinafter described, allows each protruding length X from a reference plane (for example, the bottom 34a of the case 16a) to each of the ends of protrusions 32a of the pure silicon members 18a to be uniformed by eliminating dimensional differences among the pure silicon members 18a with its plasticity, even if the pure silicon member 18a have irregular block shapes. The foam resin mat 20a can be made of urethane foam, polyolefin foam, phenol resin foam, sponge rubber, or the like.

The "interconnected cell" resin is preferable for the foam resin mat 20a. The pure silicon members 18a can be frozen to inner surfaces of the case 16a through the ice 22a, which is made at through holes (not shown). The through holes are created from an upper surface of the foam resin mat 20a to a lower surface, and are twisted each other. Accordingly, the pure silicon members 18a can be fixed and frozen to the case 16a tightly although the foam resin mat 20a is existed between them.

For ensuring the freeze of the pure silicon members 18a and the case 16a, it is preferred to provider recesses 35a on bottom side of lateral surface of the case 16a and protruded portions 36a fitted into the recesses 35a on bottom side of lateral surface of the foam resin mat 20a. In addition, a net 70a or cross-bars (not shown) may also be provided in the case 16a. The recesses 35, the protruded portions 36a, and the net 70a can be provided at one time. It is preferred to provide the net 70b or the like in the upper case 16b that has crushing surface 14b facing downward, because the pure silicon members 18b can be fallen from the upper case 16b by decreasing of the freeze force between the inner surface of the case 16b and the ice 22b by heat generated from reaction of pushing the raw silicon G.

In addition, when a retainer (not shown) that retains the pure silicon members 18a at appropriate position is provided, the foam resin mats 20 are not necessary.

A peripheral border of the net 70a is fixed tightly to the inner side surface of the case 16a by adhesion or weld. The net 70a is positioned apart from the bottom 34a of the case 16a and buried in the foam resin mat 20a that is formed by filling and foaming liquid foam resin such as urethane foam or the like. In addition, cross-bars (not shown) also be positioned and buried. The net 70a acts as reinforcement for fixing the case 16a and the foam resin mat 20a tightly. The net 70a, therefore, prevents the pure silicon members 18a, the foam resin mat 20a, and ice 22a, which is existed between them, from dropping out from the case 16a, even if the freeze force between the inner surface of the case 16a and the ice 22a is decreased by heat generated from reaction force with a force of pushing the raw silicon G.

When irregular shape pure silicon members 18a' (as shown in FIG. 1 (c)) are provided, because the volumetric capacities of the irregular shape pure silicon members 18a' are smaller than those of the ice 22a or the foam resin mat 20a, the thermal capacity of the bed 12a as a whole becomes smaller. Then, the bed 12a becomes easy to warm up; the ice 22a can be easy to melt. In this case, with or without the net 70a, a thermal capacity increasing member 150 may be fixed tightly to the inner surface of the case 16a by adhesion or weld between the pure silicon members 18a' and the bottom 34a of the case 16a. In this embodiment, a stainless steel plate is used as the thermal capacity increasing member 150, but other material that has a thermal capacity larger than that of the foam resin mat 20a may be applied. By fixing such a thermal capacity increasing member 150, the ice 22a becomes to be difficult to melt even if the irregular shape pure silicon members 18a' are provided. In FIG. 1 (c), the thermal capacity increasing member 150 is fixed only to the lower case 16a without the net 70a as shown in FIG. 1 (c). But the member 150 may be fixed to the upper case 16b with or without the net 70a.

The ice 22a, obtained by freezing pure water or extra-pure water, fixes the pure silicon members 18a to the case 16a as described above. Potable water or the like that includes impurities also may be used as the "pure water" under a condition that the raw silicon G is purified by etching after crushing.

Figure 6:
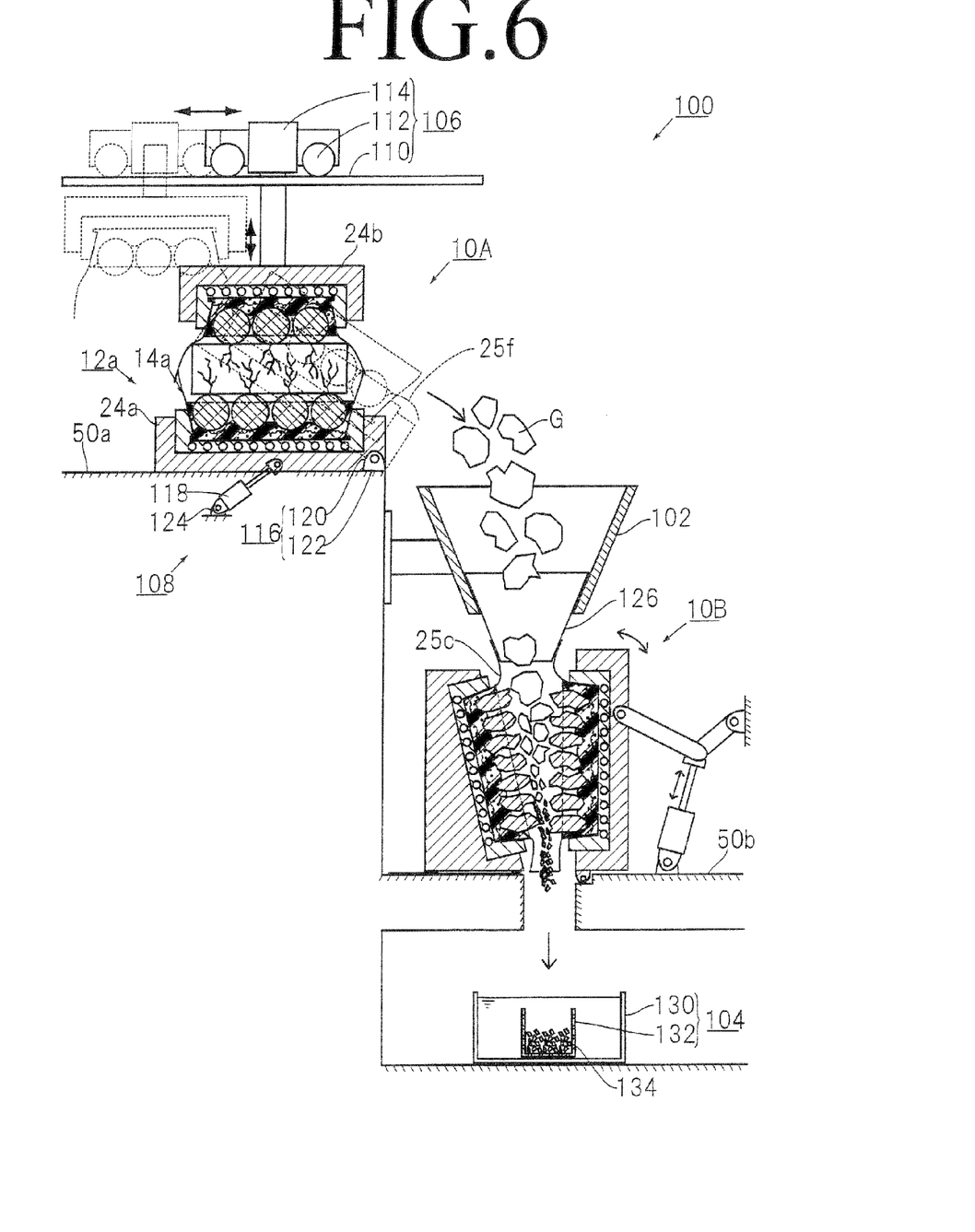
FIG. 6 shows a raw silicon crushing system according to third embodiment.

The base 24a is for fitting the case 16a. A device for lifting or tilting the base 24a up and down may be provided for the base 24a. For example, as shown in FIG. 6, an actuator 118 tilting the base 24a and a lower bed pivoting device 116, or a center of the tilt, provided for the lower base 24a. As shown in FIG. 1(a), a hydraulic cylinder 37 lifting the upper base 24b up and down, and pressing the raw silicon G between the upper base 24b and the lower base 24a may be provided to the upper base 24b. Furthermore, a ball-screw or the like may also be provided instead of the hydraulic cylinder 37.

The skirt 25a is an enclosure preventing the crushed raw silicon G from scattering from the raw silicon crusher 10A during crush of the raw silicon G by applying pressure. The skirt 25a is made of Teflon sheet film approximately 0.5 mm in thickness. The skirt 25a may be made of other material, for example, any kind of sheets except Teflon provided pure ice on its surface facing the raw silicon G.

A lower side of the skirt 25a is provided between the inner surface of the case 16a and the foam resin mat 20a. An upper edge of the skirt 25a is positioned near the crushing surface 14b beyond the crushing surface 14a; an upper side of the skirt 25a is flared outwardly thereabove Consequently, the crushing surface 14a is positioned at the bottom of the almost cylindrical skirt 25a.

A length from the crushing surface 14a to the upper edge of the skirt 25a is decided based on the size of the raw silicon G so as to cover the space between both crushing surfaces 14a, 14b in combination with the skirt 25b of the bed 12b. It is preferred to make corners of the skirt 25a arcs along an inner shape of the case 16a, because that makes easily the skirt 25a self-standing.

A basic procedure for manufacturing the bed 12a is explained as follows with reference to FIG. 3. The case 16a fitted to the base 24a is provided. The skirt 25a is fixed to the inner surface of the case 16e by adhesive or screw (see FIG. 3(a)). In case of using the net 70a, it is necessary to fix the skirt 25a to all circumference of the inner surface of the case 16a. And the skirt 25a is situated nearer to the opening 30a than the net 70a.

Figure 3:
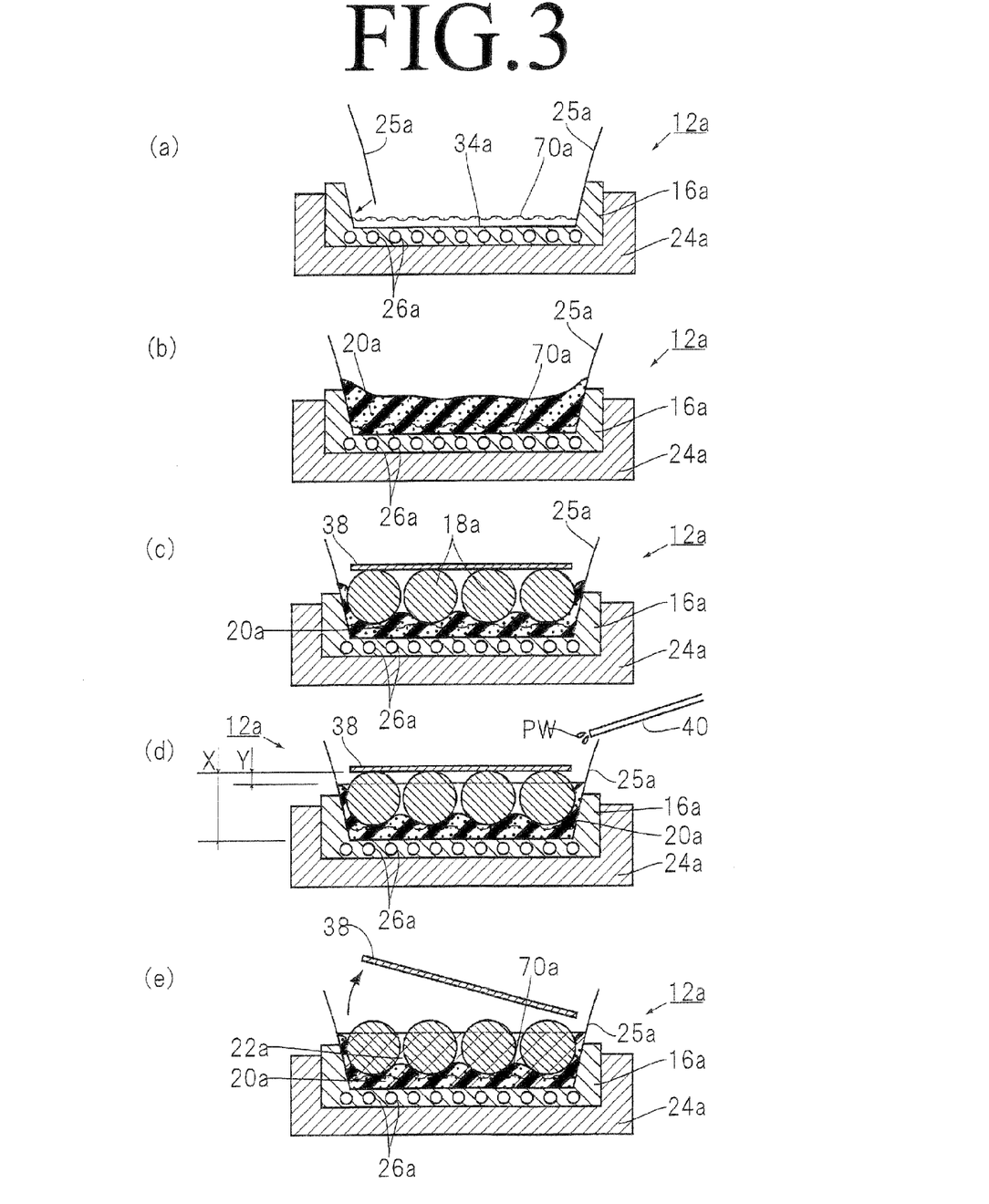
FIG. 3 shows a fabrication procedure for a bed of a raw silicon crusher.

Liquid foam resin, urethane foam or the like, is filled and foamed in the case 16a, with providing the foam resin mat 20a, as shown in FIG. 3 (b).

After providing the foam resin mat 20a as it encloses the net 70 by foaming, predetermined number of the pure silicon members 18a, four members are provided in this embodiment, are laid on the foam resin mat 20a through the opening 30a. Then each projecting length X of all pure silicon members 18a is uniformed by putting a Teflon flat board 38 against the pure silicon members 18a as shown in FIG. 3 (c). A silicon board or a board combined a quartz board and a stainless board may be put. The quartz board must be put against the pure silicon members 18a.

After that, the case 16a with the foam resin mat 20a is filled with pure water PW through a pure water supplying hose 40 or the like. Then cooling inside of the case 16a by passing refrigerant L through cooling pipes 26a of the case 16a causes the pure water PW to form the ice 22a.

In addition, it is preferred to level the surface of the ice 22a higher than the central axis of the pure silicon members 18a. In other words, the length Y from the surface of the ice 22a to ends of protrusions 32a is preferred to be shorter than radii of the pure silicon members 18a. Otherwise the pure silicon members 18a become easier to come off upward. Furthermore, the ice 22a may be formed within a refrigerator that can cool until approximately −65° C. If the capacity of the refrigerator is enough, more than one bed 12 can be made at a time.

After forming the ice 22a, the flat board 38 is removed. Then the bed 12 is completed as shown in FIG. 3(e).

Interconnected cell foam resin shaped in the form of a mat previously may be stacked on the net 70a in the case 16a. In this case, the net 70a as reinforcement for fixing the case 16a and the ice 22a including the foam resin mat 20a prevents the pure silicon members 18a, the ice 22a, and the foam resin mat 20a from coming off from the case 16a. Because the net 70a located between the foam resin mat 20a and the bottom 34 of the case 16a is surrounded with the ice 22a.

Description will be made of the procedure to crush the raw silicon G with the raw silicon crusher 10A according to the first embodiment with reference to FIG. 1(a). The upper bed 12b is lifted up with the hydraulic cylinder 37 provided for the upper bed 12b at the beginning. The rod-shaped raw silicon G is put on the crushing surface 14a, more properly the end of protrusion 32a of the pure silicon members 18a, 18b, perpendicular to the lengthwise direction of the pure silicon members 18a, after checking the sufficient clearance between the both crushing surfaces 14a, 14b.

After the raw silicon G is put on, the upper bed 12b is begun to lower slowly with the hydraulic cylinder 37. Then the upper and lower skirt 25a, 25b enclose a space between the both crushing surface 14a, 14b, followed by the crushing surface 14b of the upper bed 12b, more properly the end of protrusion 32b of the pure silicon member 18b, being abut on a surface of the raw silicon G. In pressing the raw silicon G downwards with the upper bed 12b powered by the hydraulic cylinder 37 from this condition, cracks are generated at points where the ends of protrusions 32 of the pure silicon members 18 abut the raw silicon G. Further press causes the raw silicon G to crush at a certain point in time.

If the crushing process can be finished at this step, the upper bed 12b will be lifted up. Or the bed 12b may be lowered more. When the bed 12b is lowered more, the crushed raw silicon G becomes smaller blocks. Because the crushed raw silicon G in lump fallen into a clearance between both of the pure silicon members 18a, 18b, the raw silicon G is not only crushed between both of the ends of protrusions 32a, 32b of the pure silicon members 18a, 18b but also between the ends of protrusions 32a, 32b and the ice 22a, 22b, or both of the ice 22a, 22b.

In this embodiment of the raw silicon crusher 10A, the crushing surfaces 14a, 14b positioned face-to-face are constituted with the surface of the ends of protrusions 32a, 32b of the pure silicon members 18a, 18b and the surface of the pure ice 22a, 22b. And the pure silicon members 18a, 18b are fixed with the pure ice 22a, 22b. Consequently, the raw silicon G is contacted directly on the pure silicon members 18a, 18b, the pure ice 22a, 22b, or the Teflon skirt 25a, 25b only, and the possibility for the decrease in purity of the raw silicon will be minimized.

Because the ends of protrusions 32b of the pure silicon members 18b arranged in the upper bed 12b are located between each of the ends of protrusions 32a of the pure silicon members 18a arranged in the lower bed 12a, the ends of protrusions 32b are not opposed to the ends of protrusions 32a. Consequently, the pressure for pinching and pressing the raw silicon G between the upper bed 12b and the lower bed 12a is applied not only as "compressive force" (see FIG. (a)) but as "moments", which can crush the raw silicon G easily. When the ends of protrusions 32b are not opposed to the ends of protrusions 32a, as shown in FIG. 4 (b-1), downward pressure from the upper ends of protrusions 32b becomes the "moments" about the lower ends of protrusions 32b, as shown conceptually in FIG. 4(b-2). This enables to crush the raw silicon C easily.

Even if the pure silicon members 18a, 18b are in the shape of irregular-mass, the foam resin mats 20a, 20b arranged between the pure silicon members 18a, 18b and the bottom 34a, 34b of the cases 16a, 16b remove the difference between each of the pure silicon members' lengths. This allows the uniformity of the protruding lengths X.

(Second Embodiment)

The raw silicon crusher 10B, shown in FIG. 5, according to the second embodiment is suitable for crushing raw silicon G in lump obtained by quenching once (or more) rod-shaped (or block-shaped, irregular-shaped) raw silicon G. The raw silicon crusher 10B has a pair of beds 12c, 12d as well as the first embodiment. The raw silicon G is crushed by applying pressure between a pair of crushing surfaces 14c 14d, facing each other, on the beds 12a, 12b.

Unlike the first embodiment, irregular-shaped pure silicon members in lump 18c, 18d are used in this embodiment. Additionally, the irregular-shaped pure silicon members in lump 18c, 18d in FIG. 5 are arranged as they stuck out from surfaces of the ice 22c, 22d like tusks as well as the embodiment in FIG. 1 (b). After forming the top of the irregular-shaped pure silicon members 18c, 18d in flat as well as the embodiment in FIG. 1 (c), the flat-top of the irregular-shaped pure silicon members in lump 18c, 18d may be located on same planar. In other words, protruding lengths X of the pure silicon members 18c, 18d are uniformed.

One bed 12c (left side in the figure) in this embodiment is arranged on a stage 50 as its crushing surface 14c faces toward horizontal direction or obliquely upward. In particular, an under surface of a base 24c of the bed 12c is fixed on the upper surface of the stage 50 with a slider 52. The slider 52 allows choosing a state that the bed 12c can slide on the stage 50 or a state that the bed 12c is fixed on the stage 50.

The other bed 12d (right side in the figure) is arranged on the stage 50 as its crushing surface 14d faces toward horizontal direction and toward the crushing surface 14c. The clearance between both of the crushing surface 14c, 14d is narrower at the bottom than at the top. In particular, a lower end of a base 24d of the bed 12d is pivotally mounted on the upper surface of the stage 50 with an axis 54. Pivoting machinery 56 for pivoting the bed 12d is provided on the base 24d of the bed 12d.

The pivoting machinery 56 comprises a link mechanism 58 and a hydraulic (or a pneumatic) actuator 60. The link mechanism 58 comprises two link members 62a, 62b. One end of one link member 62a is pivotally mounted on upper side of the base 24d of the bed 12d. One end of the other link member 62b is pivotally mounted on a bracket 64 located on a steel beam of a plant building or the like. The other end of one link member 62a, the other end of the other link member 62b, and one end of the actuator 60 are pivotally connected to each other with a pin 66. And the other end of the actuator 60 is pivotally mounted on a bracket 68 located on the upper surface of the stage 50. Consequently, expansion and contraction of the actuator 60 by hydraulic pressure (or pneumatic pressure) causes the bed 12d to pivot against the stage 50 with the link mechanism 58.

In this embodiment, the raw silicon G is supplied from top of the beds 12c, 12d, and discharged from bottom. Unlike the first embodiment, the skirt 25c is not divided. The skirt 25c is provided around inner wall of both the cases 16c, 16d so as to be formed "sac-like" shape integrally. The "sac-like" skirt 25c has a raw silicon supply opening 25d at top end and a raw silicon discharge opening 25e at bottom end. For checking the crushing surfaces 14c, 14d, a fastener or the like (not shown) is provided on the skirt 25c during maintenance.

Description will be made of the procedure to crush the raw silicon G with the raw silicon crusher 10B according to the second embodiment. First, the clearance between the crushing surface 14c and the crushing surface 14d is adjusted with the slider 52 provided on the lower surface of the bed 12c. As described above, the crushing surface 14c facing obliquely upward and the crushing surface 14d facing horizontal direction cause a clearance "d" at lower end of both crushing surfaces 14c, 14d to be minimum. A length of this clearance "d" is equal to maximum diameter of the raw silicon G discharged from the raw silicon crusher 10B.

After the clearance "d" is adjusted, the bed 12c is fixed on the stage 50 by using the slider 52. Then the raw silicon G in lump is fed to top of the clearance between both crushing surfaces 14a, 14b.

After the raw silicon G is fed, the actuator 60 of the pivoting machinery 56 provided on the bed 12d pivots the bed 12d about the stage 50. The crushing surface 14d of the pivoted bed 12d moves closer to or further away from the crushing surface 14d repeatedly. The raw silicon G located between both crushing surface 14c, 14d is crushed between both ends of protrusions 32 of the pure silicon members 18, between the ends of protrusions 32 and the ice 22, and between both ices 22.

The particle diameter of the raw silicon G becomes smaller by crushing between both crushing surfaces 14c, 14d. The smaller the raw silicon G becomes, the lower the position of the raw silicon G located in is. Finally, the raw silicon G, of which particle diameter is smaller than the length of the clearance "d" between both crushing surface 14c, 14d, is discharged from the raw silicon crusher 10B.

(Third Embodiment)

The raw silicon crushing system 100 (as shown in FIG. 6) according to the third embodiment crushes the rod-shape raw silicon G in two stages to "a ball for baseball" or "a peanut" size by combining in series the raw silicon crushers of the first and the second embodiment.

The raw silicon crushing system 100 has a step-like stage 50 having an upper stage 50a and a lower stage 50b. And the raw silicon crusher 10A and 10B, a chute 102, and a raw silicon washer 104 are provided on the upper and lower stage 50a, 50b. The flat-top irregular shape pure silicon members 18c, 18d may be provided.

The raw silicon crusher 10A, as described above, is provided on the upper stage 50a. For operating the raw silicon crushing system 100, an upper bed traverse device 106 and a lower bed tilting device 108 also be provided.

The upper bed 12b of the raw silicon crusher 10A spaced apart the raw silicon G is traversed with the upper bed traverse device 106. The upper bed traverse device 106 has horizontal traverse rails 110, a traverse unit 114 having wheels 112 rolling on the traverse rails 110. The upper bed 12b is hanged from the traverse unit 114.

The lower bed tilting device 108 has a lower bed pivoting device 116 and an actuator 118.

The lower bed pivoting device 116 has a bracket 120 provided on the edge of the upper stage 50a and a pin 122. The lower bed 12a of the raw silicon crusher 10A is pivotally mounted on the upper stage 50a with the pin 122.

The actuator 118 is extensible by hydraulic or pneumatic pressure. One end of the actuator 118 is pivotally mounted on the base 24a of the bed 12a. And the other end of the actuator 118 is pivotally mounted on a bracket 124 located on a steel beam of a plant building or the like.

The crushing surface 14a of the lower bed 12a is leveled, when the actuator 118 is shortened. Extending the actuator 118 causes the crushing surface 14a of the lower bed 12a to tilt about the pin 122 as shown in FIG. 6 with broken lines.

The raw silicon crusher 10B as described above is provided on the lower stage 50b.

The chute 102 is a funnel-shaped structure located above the raw silicon crusher 10B. And the chute 102 is positioned so as to lead the raw silicon G in lump crushed within the raw silicon crusher 10A (first crushing) and slipped over the sloping crushing surface 14a of the tilted lower bed 12a to the raw silicon crusher 10B without scattering. The raw silicon G is restricted to contact Teflon only by providing metal plates with Teflon coating on inner surfaces of the chute 102. This eliminates contamination in the raw silicon G.

Furthermore, a funnel-shaped skirt 126 is provided inner-bottom part of the chute 102. The lower end of the skirt 126 is set into the raw silicon supply opening 25d of the skirt 25c of the raw silicon crusher 10B.

The raw silicon washer 104 has a hot pure water tank 130 and a basket 132. The hot pure water tank 130 is a vinyl chloride or PPE (polyphenylene ether) tank located just beneath the clearance between both crushing surfaces 14c, 14d of the raw silicon crusher 10B. And the hot pure water tank 130 storing approximately 60° C. hot pure water (or extra-pure water) has an opening for receiving crushed raw silicon G from the raw silicon crusher 10B. The pure water is supplied to the hot pure water tank 130 continuously or discontinuously. Excess pure water overflows.

The basket 132 is a box submerged in the hot pure water tank 130 and receiving the falling raw silicon G. A lot of holes 134, of which diameters are not larger than that the granular raw silicon G can pass through, are provided on the side and bottom surface of the basket 132. Consequently, continuous lifting and lowering of the basket 132 filled with the raw silicon G in the pure water causes powdered raw silicon to remove from the surface of the raw silicon G. After flowing out through the holes 134 from the basket 132, the powdered raw silicon is deposited in the hot pure water tank 130. The deposited powdered raw silicon is cleaned regularly.

Description will be made of the procedure to crush the raw silicon G with the raw silicon crushing system 100 according to this embodiment. First, the rod-shaped raw silicon G is crushed, called first crushing, to the raw silicon in lump with the raw silicon crusher 10A as described in the first embodiment. After the first crushing, the upper bed 12b is traversed with the upper bed traverse device 106 not to interfere the tilted lower bed 12a. Then the crushed raw silicon is slipped off the crushing surface 14a to the chute 102 by tilting the lower bed 12a with the lower bed tilting device 108. One side, where the raw silicon G is slipped, of the skirt 25a of the lower bed 12a may be flexible. This causes the skirt 25a not to prevent the crushed raw silicon G from sliding.

The raw silicon G passed through the chute 102 is guided into the space between the crushing surface 14c and the crushing surface 14d. The bed 12c is positioned with the slider 52 before the silicon G is guides.

After the raw silicon G is guided into the raw silicon crusher 10B, the raw silicon G is crushed, called second crushing, to be a grain size with the raw silicon crusher 10B. The second crushing is completed, when all of the raw silicon G becomes smaller than predetermined grain size and flows out of the space between both of the crushing surface 14c, 14d.

After a period of time from starting second crushing with the raw silicon crusher 10B, the raw silicon G smaller than the predetermined grain size is started to be discharged. The discharged raw silicon G falls into the hot pure water tank 130 of the raw silicon washer 104. Then the discharged raw silicon G is received in the basket 132 submerged into the hot pure water tank 130. After the discharge of the raw silicon G from the raw silicon crusher 10B is completed, the basket 132 filled with the raw silicon G is pulled out of the hot pure water tank 130. While the basket 132 is pulled out, the powdered raw silicon G and the pure water pass through the holes 134 of the basket 132. Finally, silicon crushing is completed by drying the raw silicon G with a dryer (not shown).

What is claimed is:

1. A raw silicon crusher comprising:
a pair of beds facing each other; and
a pair of crushing surfaces on the beds crushing the quenched pure raw silicon by applying pressure,
wherein each of the beds comprises:
a box-shaped case having an opening on the crushing surface side;
non-quenched pure silicon members arranged inside of the case and protruding from the opening;
a block of ice made from purified water provided inside of the case and fixing the pure silicon members to the case, and
each of the crushing surfaces comprises:
surfaces of ends of protrusions of the pure silicon members;
surface of the block of ice between each of the ends of protrusions.

2. The raw silicon crusher according to claim 1, wherein the ends of protrusions of the pure silicon members of one bed protruding from the opening may be located between the ends of protrusions of the pure silicon members of the other bed protruding from the opening in applying pressure to the raw silicon.

3. The raw silicon crusher according to claim 1, further comprising
interconnected-cell foam resin mats arranged between the pure silicon members and bottoms of the cases.

4. The raw silicon crusher according to claim 1, wherein each of the beds has a skirt enclosing a space between the crushing surfaces during crush of the raw silicon.

5. The raw silicon crusher according to claim 1, wherein the pair of beds is arranged vertically, and the crushing surfaces are farther apart at the top than at the bottom.

* * * * *